United States Patent
Cordeiro et al.

(10) Patent No.: US 8,532,001 B2
(45) Date of Patent: Sep. 10, 2013

(54) BEACONING AND FRAME STRUCTURE FOR DIRECTIONAL ANTENNA COMMUNICATIONS

(75) Inventors: Carlos Cordeiro, Portland, OR (US); Guoqing Li, Portland, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 12/157,216

(22) Filed: Jun. 9, 2008

(65) Prior Publication Data

US 2009/0232035 A1 Sep. 17, 2009

Related U.S. Application Data

(60) Provisional application No. 61/035,480, filed on Mar. 11, 2008.

(51) Int. Cl.
*H04B 7/00* (2006.01)

(52) U.S. Cl.
USPC ........................................... 370/310

(58) Field of Classification Search
USPC ................. 370/241, 252, 310, 312, 328, 329, 370/330, 342; 455/39, 41.2
See application file for complete search history.

(56) References Cited

U.S. PATENT DOCUMENTS

| | | | |
|---|---|---|---|
| 5,594,720 A | | 1/1997 | Papadopoulos et al. |
| 5,603,095 A | * | 2/1997 | Uola ........................... 455/554.2 |
| 5,784,031 A | * | 7/1998 | Weiss et al. .................. 342/373 |
| 5,956,621 A | * | 9/1999 | Weiss et al. .................. 370/311 |
| 8,054,223 B2 | * | 11/2011 | Lakkis ........................... 342/367 |
| 8,054,225 B2 | * | 11/2011 | Sim et al. ....................... 342/432 |
| 8,081,110 B2 | * | 12/2011 | Lakkis ........................... 342/367 |
| 8,095,069 B2 | * | 1/2012 | Maltsev et al. ............... 455/41.2 |
| 2005/0285803 A1 | | 12/2005 | Iacono et al. |
| 2006/0172711 A1 | | 8/2006 | King et al. |
| 2006/0268908 A1 | * | 11/2006 | Wang et al. ................... 370/401 |
| 2007/0064706 A1 | | 3/2007 | Fontaine et al. |
| 2007/0258431 A1 | | 11/2007 | Shin et al. |
| 2008/0019347 A1 | | 1/2008 | Shin et al. |
| 2008/0037465 A1 | * | 2/2008 | Ngo et al. ...................... 370/329 |
| 2008/0056188 A1 | * | 3/2008 | Lu et al. ........................ 370/330 |

(Continued)

FOREIGN PATENT DOCUMENTS

| | | |
|---|---|---|
| CN | 1871872 A | 11/2006 |
| WO | 2009/114574 A2 | 9/2009 |
| WO | 2009/114574 A3 | 12/2009 |

OTHER PUBLICATIONS

Li et al, Discovering Neighbors in Wireless Personal Area Networks, pending U.S. Appl. No. 12/150,622, filed Apr. 30, 2008.

(Continued)

*Primary Examiner* — Chi Pham
*Assistant Examiner* — Robert Lopata
(74) *Attorney, Agent, or Firm* — Kacvinsky Daisak PLLC (57) ABSTRACT

In a wireless communications network containing network devices capable of both directional and omnidirectional communications, a network controller may arrange a series of superframes into groups of multiple consecutive superframes, in which only one superframe in each group contains an omnidirectional beacon, and the remainder of the superframes in the group contain only directional beacons.

19 Claims, 6 Drawing Sheets

(56) References Cited

U.S. PATENT DOCUMENTS

2009/0122715 A1* 5/2009 Lakkis ................ 370/252
2009/0135064 A1* 5/2009 Sim et al. .............. 342/368
2009/0160707 A1* 6/2009 Lakkis ................ 342/367
2011/0044224 A1* 2/2011 Chou et al. ............ 370/312

OTHER PUBLICATIONS

Lee et al, "Issues on Super-frame Size for Uncompressed Video Traffic", IEEE 802.15-07-0896-01-003c, Nov. 2007, Slides 1-26.

International Search Report/ Written Opinion received for PCT Patent Application No. PCT/US2009/036727, mailed on Nov. 11, 2009, pp. 12.

International Preliminary Report on Patentability received for PCT Patent Application No. PCT/US2009/036727 mailed on Sep. 23, 2010, 7 pages.

Office Action received for Taiwan Patent Application No. 098107698, mailed Aug. 9, 2012, 12 pgs. including 4 pgs. English translation.

Office Action received for Chinese Patent Application No. 200910138717.1 mailed Aug. 13, 2012, 17 pgs. including 10 pgs. English translation.

Office Action received for Taiwan Patent Application No. 098107698, mailed Jan. 14, 2013, 11 pages including 4 pages English translation.

* cited by examiner

BEACONING AND FRAME STRUCTURE FOR DIRECTIONAL ANTENNA COMMUNICATIONS

CROSS-REFERENCE TO RELATED APPLICATIONS

This application is related to U.S. provisional patent application Ser. No. 61/035,480, filed Mar. 11, 2008, and claims priority to that filing date for all applicable subject matter.

BACKGROUND

A wireless network that operates at very high frequencies (e.g., 60 GHz) is typically restricted to a small area, since the transmissions are highly attenuated by obstructions and even by the oxygen in the air. Such technology is generally targeted at wireless personal area networks, and is frequently implemented as piconets in which devices in the same network can communicate directly with each other without routing every communication through the centralized piconet controller. In high density communications environments in which multiple piconets may co-exist in a relatively small area (e.g., in business offices, university labs, apartment buildings, etc.), omnidirectional antennas may be undesirable, since each device in a piconet might be able to interfere with other devices in the same piconet and/or in a neighboring piconet. For this reason, directional antenna systems on each device in the piconet can be highly desirable. However, not all communications in a network can be effectively handled with directional communications, and implementing directional communications can be challenging with conventional communication protocols.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term 'wireless' and its derivatives may be used to describe circuits, devices, systems, methods, techniques, communications channels, etc., that communicate data by using modulated electromagnetic radiation through a non-solid medium. The term 'wireless' refers to the communication medium, not to the construction of the individual devices. The term 'superframe' may be used to describe a time unit for communications in a network, during which the communications within the superframe contain one or more beacons and zero or more time allocations for communications between devices in the network. All the superframes described in this document contain at least one beacon and at least one time allocation.

Some embodiments of the invention may restrict omnidirectional beacons (which have a greater potential for interference) to particular superframes, and use directional beacons in the other superframes. This may reduce the overall likelihood of intra-network or inter-network interference during the beacon periods. In other embodiments, devices with a directional link may monitor the link during communications taking place between other devices in another directional link, to determine if there may be interference between the two links.

Directional and Omnidirectional Superframes

Figure 1A:
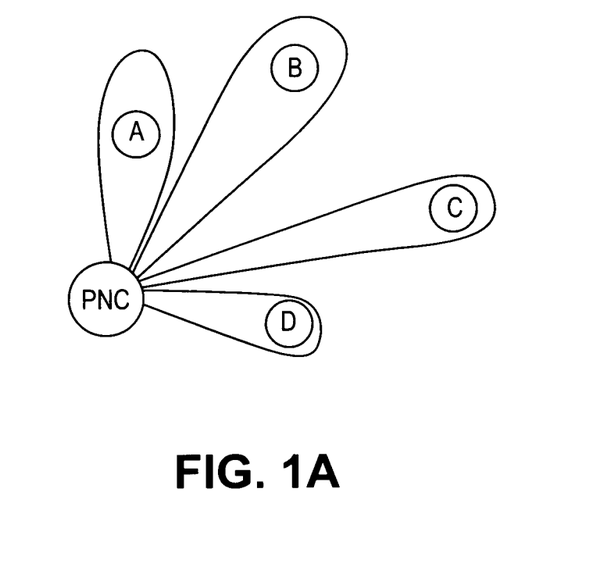
FIGS. 1A and 1B show a network controller making directional and omnidirectional wireless transmissions to other network devices in a wireless network, according to an embodiment of the invention.
Figure 1B:
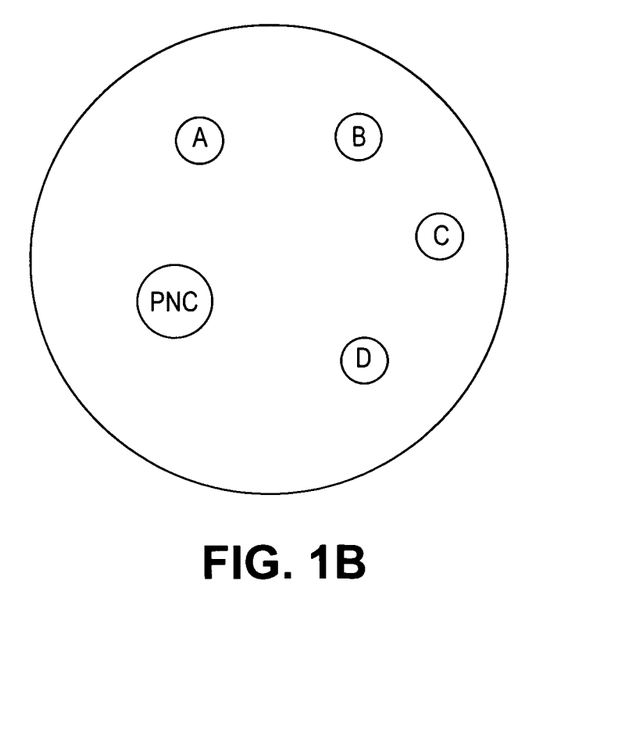

FIGS. 1A and 1B show a network controller making directional and omnidirectional wireless transmissions to other network devices in a wireless network, according to an embodiment of the invention. In the illustrated embodiment, a network controller PNC is shown transmitting to four other network devices A, B, C, and D. The term PNC is used to designate a piconet controller in a network designated as a piconet (for example, a piconet using a 60 GHz frequency), but this is only for purposes of example. In other embodiments, other types of networks, network controllers, and frequencies may be used. In some embodiments, some or all of the devices in the network (including the controller) may each have multiple antennas to implement directional communications. Similarly, some or all of the devices in the network may be portable devices using a battery for operating power.

In FIG. 1A, the transmissions from the PNC are directional, and are directed to specific network devices A, B, C, and D, respectively. With directional transmissions, the transmitted signal may be relatively strong in the intended direction, but relatively weak in other directions. Various techniques may be used to achieve such directional transmissions, such as but not limited to phased array antenna systems, switched beam antenna systems, non-trainable fixed antennas, etc. Each directional transmission may also have an angular transmission envelope (as shown by the teardrop-shaped outlines), within which the signal is strong enough to be reliably received by another network device, but outside of which the signal is too weak to be reliably received. Of course, the envelopes may not be as sharply defined as shown, but rather gradually taper from a strong signal to a weak single near the edges of the envelope. In some embodiments, each directional transmission may be made at a separate time, while in other embodiments, multiple directional transmissions may be made simultaneously from the PNC in different directions.

In FIG. 1B, the transmissions from the PNC are omnidirectional, i.e., the signal may radiate outwardly in a 360 degree circle, with sufficient strength throughout the circle to be reliably received in all directions, as illustrated by the circular transmission envelope. With this omnidirectional transmission, the same signal may be received by each of devices A, B, C, and D at the same time, but may also be received by other devices within the circular envelope, and may conceivably create interference for those other devices. Hence the use of directional transmissions may be used to reduce the interference created within densely populated networks, and/or between neighboring networks.

Although omnidirectional transmission is generally thought of as simultaneously transmitting the same signal in all directions, within the context of this document omnidirectional transmission may also include transmitting the same information in a series of directional transmissions that collectively cover the same 360 degree arc (for example, a series of eight directional transmissions, each transmitting the same information and covering a different 45 degree arc). Because directional transmissions sometimes permit higher data throughput, these two techniques may offer similar total times to transmit the same data. For example, transmitting a given amount of data in eight separate directional transmissions may require approximately the same total time as a single transmission that simultaneous transmits the data in a 360 degree arc.

These illustrations show directional and omnidirectional transmissions primarily in two dimensions (typically in the horizontal directions), which could be interpreted as implying that a significant vertical angle between the transmitter and receiver might place the receiver outside the envelope. However, some embodiments may have a significant vertical component to the transmission envelope, for directional and/or omnidirectional transmissions. The terms directional and omnidirectional are intended to cover embodiments that are primarily two dimensional and also embodiments that are primarily three dimensional in coverage.

The reception of signals may also be directional or omnidirectional in nature, with various antenna systems used for these purposes. With directional reception, signals coming from a particular direction may be reliably received, while signals that are equally strong but are coming from a significantly different direction may not be reliably received, due to the antenna(s) configuration and/or the signal processing techniques used. Multiple techniques for achieving directional transmission and/or reception are known, and are not further described here.

Figure 2:
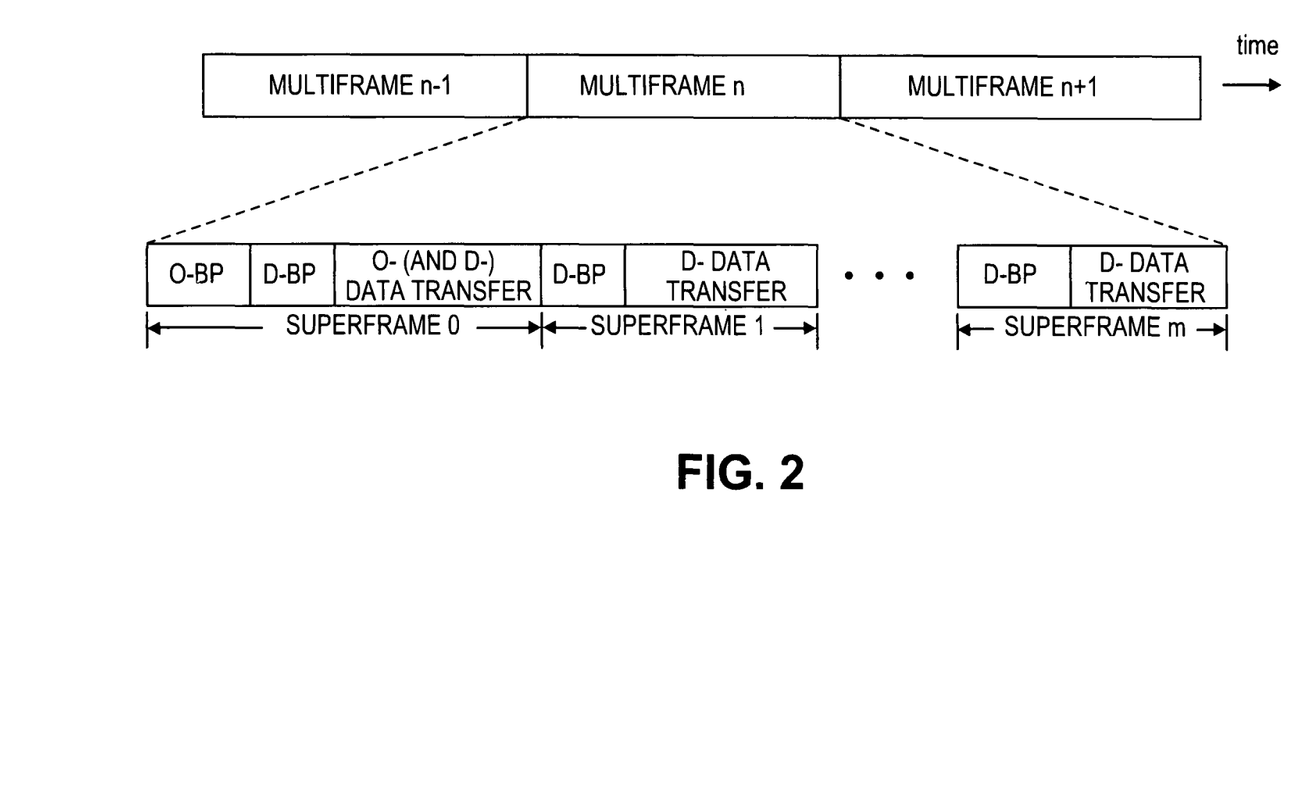
FIG. 2 shows the structure of the communications between multiple devices in a wireless network, according to an embodiment of the invention.

FIG. 2 shows the structure of the communications between multiple devices in a wireless network, according to an embodiment of the invention. In the illustrated embodiment, the communications stream is divided into multiple superframes. Within each superframe, a beacon may be transmitted by the network controller in the initial part of the superframe. The beacon period is designated as BP in the drawing, and may contain one or more beacons. Among other things, the beacon may contain information about when various other network devices may communicate during the following data transfer portion of the superframe (either with each other or in some cases with the network controller), and information about which communications techniques they should use for those communications. An omnidirectional beacon (transmitted during the O-BP) is a beacon that is transmitted omnidirectionally to the devices in the network, while a directional beacon (transmitted during the D-BP) indicates the beacon is transmitted directionally (e.g., towards one or more specific network devices). To continue the terminology, a directional superframe is a superframe whose beacon(s) is transmitted directionally, and an omnidirectional superframe is a superframe whose beacon(s) is transmitted omnidirectionally.

Figure 6:
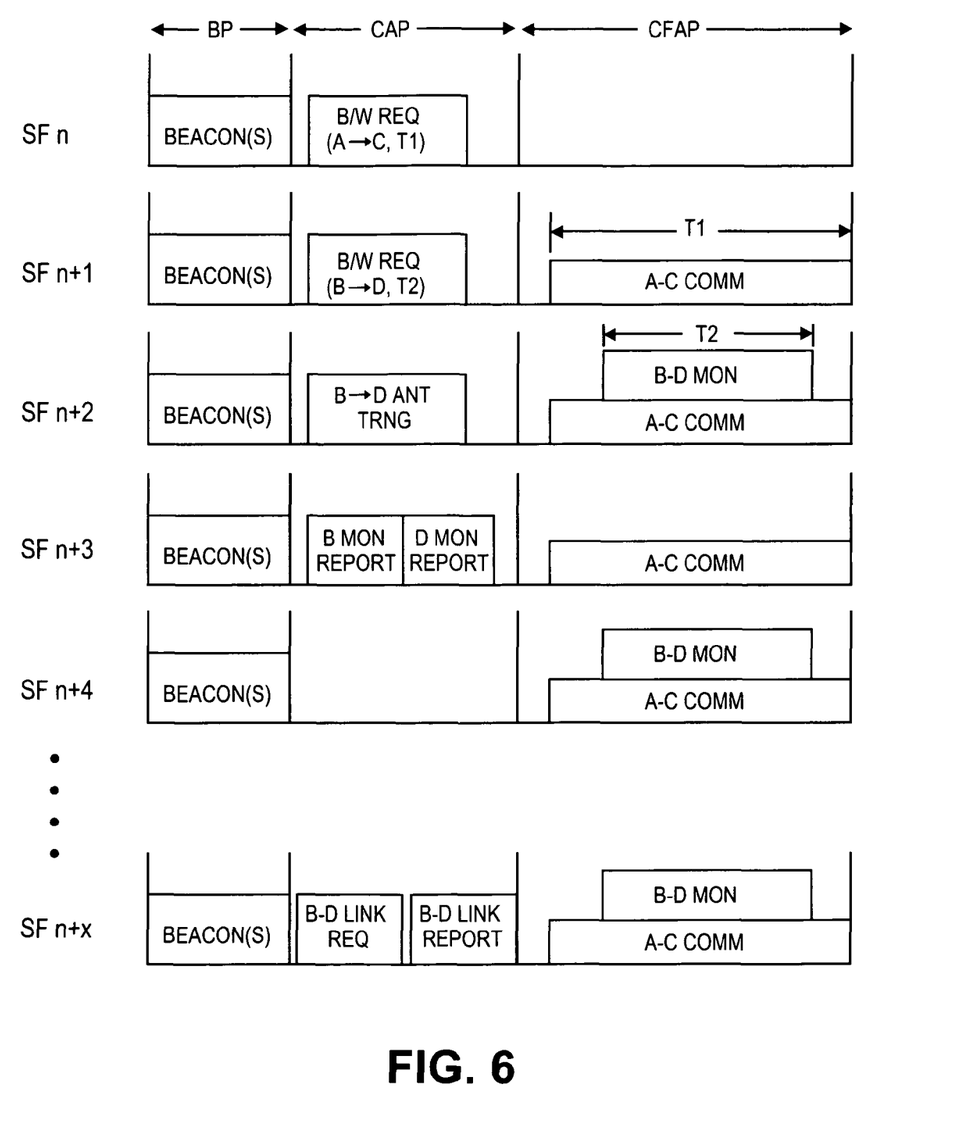
FIG. 6 shows a timing diagram of communications involving two directional communications links in a wireless network, according to an embodiment of the invention.

Similarly, O-DATA TRANSFER indicates that the devices that are communicating during the data transfer period of the superframe, as specified during the beacon, will use omnidirectional transmission and reception. D-DATA TRANSFER indicates that the devices that are communicating during the data transfer period will use directional transmission and reception. In some embodiments (not shown here, but an example is illustrated in FIG. 6), the data transfer period may be divided into a time period for pre-scheduled communications and another time period for contention-based communications in which the devices wanting to transmit compete for access to the wireless medium. A quantity of m+1 superframes are shown (where m may be an integer of 1 or more), with only one of the superframes having an omnidirectional beacon. The remainder of the superframes (in this group of m+1 superframes) each have directional beacons only. This grouping of a single omnidirectional superframe with one or more directional superframes, is labeled here as a multiframe. The ongoing communications in the network may comprise a series of such multiframes, with each multiframe containing one omnidirectional superframe and one or more directional superframes. Although the superframe 0 with the omnidirectional beacon is shown first in the multiframe, other embodiments may divide the communication into multiframes in a manner that places the omnidirectional beacon later than the first superframe.

In some embodiments, omnidirectional communications are permitted only in the superframe having an omnidirectional beacon. However, at any given time, there may not be enough omnidirectional communications to fill up the data transfer portion of the superframe. For this or other reasons, some embodiments may also permit directional communications during the omnidirectional superframe, and this is indicated by the inclusion of a directional beacon in the omnidirectional superframe 0, with directional data transfer included in the data transfer portion of superframe 0. In some embodiments, omnidirectional communications may not be permitted during directional superframes (e.g., superframes 1-m in FIG. 2). In some embodiments the number of directional superframes grouped with each omnidirectional superframe may be predetermined, and may remain fixed for a defined period of time. For example, there may be at least two directional superframes for each omnidirections superframe, and that ratio may persist for at least 12 consecutive superframes. This is simply an example, and any other feasible ratio and duration may be chosen. In other embodiments, the number of directional superframes grouped with each omnidirectional superframe may vary dynamically chosen based on various criteria, such as but not limited to: 1) the volume of network traffic, 2) the number of network devices, 3) the locations of those network devices, 4) the type of network traffice, 5) any combination of these and/or other parameters, 6) etc.

These techniques may be especially advantageous in networks that are densely populated, and/or that spatially overlap other networks, and/or that are communicating high volumes of data isochronously (e.g. video streaming). In these situations, too much omnidirectional communication may create excessive interference between devices, and it may not be desirable, or even possible, to retransmit all the missing/corrupted data in the time permitted. By limiting the omnidirectional communication to only one of multiple superframes, the network's exposure to this interference may be reduced. However, sometimes omnidirectional communications may be necessary. For example, to locate new devices that may want to join the network, a device discovery request may be sent out in all directions, since it is initially unknown in which directions those new devices may be located. But if there is at least one, and preferably more than one, directional superframe for each omnidirectional superframe, the advantages of this technique may be significant.

Figure 3:
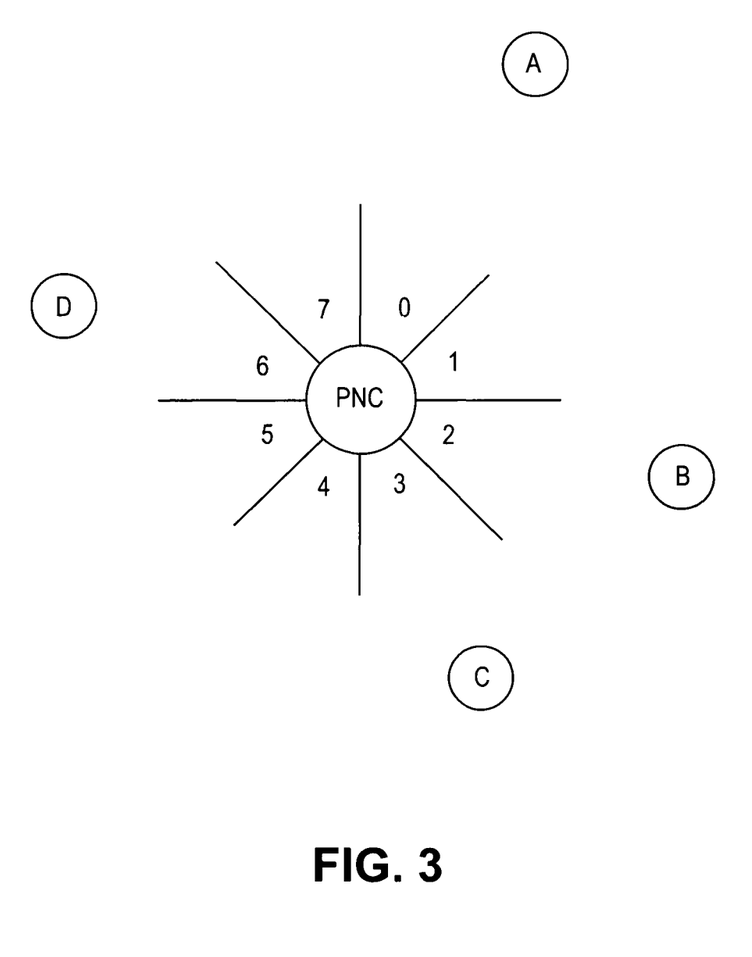
FIG. 3 shows a diagram of a network controller with associated devices in a wireless network, according to an embodiment of the invention.

FIG. 3 shows a diagram of a network controller with associated devices in a wireless network, according to an embodiment of the invention. In the illustrated example, only devices A, B, C, and D are currently associated with network controller PNC, which is able to communicate directionally in eight directions, with each directional transmission covering approximately a 45 degree arc. As previously described, to transmit a beacon simultaneously in all directions may require approximately the same amount of time as sequentially transmitting beacons directionally in each of the eight directions. However, directionally transmitting the beacons separately in only directions 0, 2, 3, and 6 permits the PNC to complete the beacon portion of the superframe in half the time as transmitting an omnidirectional beacon. The savings is even more pronounced if the PNC can make each directional transmission even narrower. For example, if the PNC can transmit in 36 different directions within an envelope of approximately 10 degrees each, the selective directional beacons to these four devices would be possible in approximately $4/36$, or slightly more than 11 per cent, of the time required for an omnidirectional beacon. In this manner, replacing many of the conventional omnidirectional transmissions with a selective number of directional transmissions may result in a significant increase in overall network throughput. Hence, limiting omnidirectional transmissions to only a subset of the superframes in the manner described, may result in not only reduced interference in the network, but also higher overall data throughput in the communications that don't involve interference.

Figure 4:
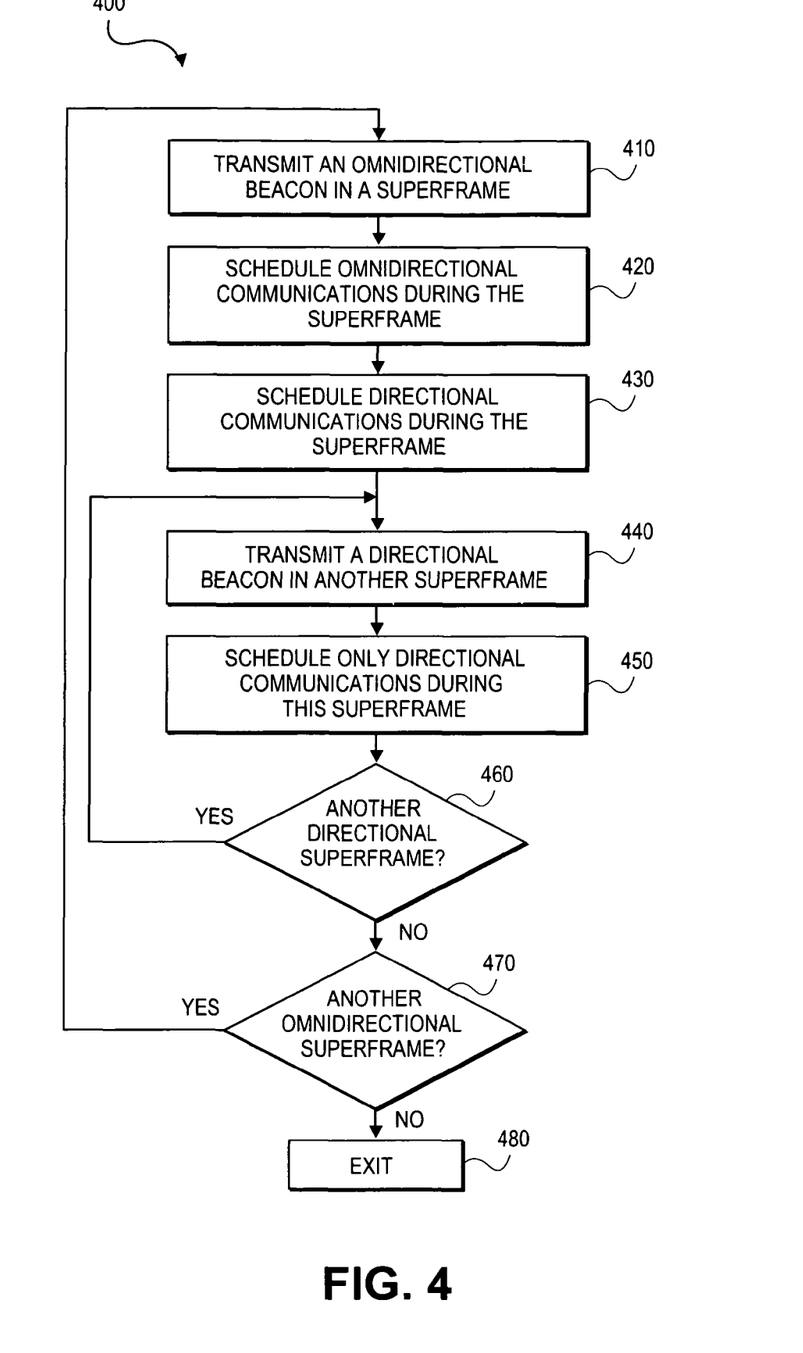
FIG. 4 shows a flow diagram of a method of communicating in a wireless network, according to an embodiment of the invention.

FIG. 4 shows a flow diagram of a method of communicating in a wireless network, according to an embodiment of the invention. In the illustrated embodiments of flow diagram 400, at 410 a network controller may transmit a superframe with an omnidirectional beacon. As a result of some of the information in the beacon, at 420 omnidirectional communications may be scheduled during the data transfer portion of the superframe. In various circumstances, these omnidirectional communications may be between the network controller and another device or between two devices other than the controller. In some embodiments, directional communications may also be scheduled during this superframe at 430. At 440 the network controller may transmit another superframe, this one containing a directional beacon. As a result of some of the information in the beacon, at 450 directional communications may be scheduled during the data transfer portion of this superframe. In various circumstances, these directional communications may be between the network controller and another device or between two devices other than the controller.

If there are to be multiple directional superframes in this sequence, as determined at 460, operations 440 and 450 may be repeated for the additional directional superframes. When it is time for another omnidirectional superframe, as determined at 470, the operations may return to 410. When referring to the term 'multiframe' previously discussed, in some embodiments a return to 410 would indicate a new multiframe. In some embodiments the number of superframes in a multiframe may be constant, but in other embodiments this may vary, and in some embodiments may vary dynamically. In some embodiments the number of directional superframes for each omnidirectional superframe may be constant, but in other embodiments this may vary, and in some embodiments may vary dynamically.

Directional Link Interference Monitoring

Referring again to the network configuration of FIGS. 1A, 1B, even though directional communications are being used, it is still possible that directional transmissions between network devices A and C might interfere with directional communications between network devices B and D. Such interference could occur for various reasons, such as but not limited to: 1) the transmission envelope of A and/or C encompasses B and/or D, 2) the reception envelope of B and/or D encompasses A and/or C, 3) a metallic structure within the transmission envelope of A or C is causing signal reflections to B or D, 4) etc. Regardless of the cause of this potential interference, B may monitor its reception envelope (i.e., monitor in the direction of D) for potentially interfering signals when A and C are communicating with each other, or at least during the time period that B and D have requested to communicate with each other. Similarly, D may monitor in the direction of B for signals from A and/or C, and for the same period of time. Interference during the selected time period may also come from other sources.

Figure 5:
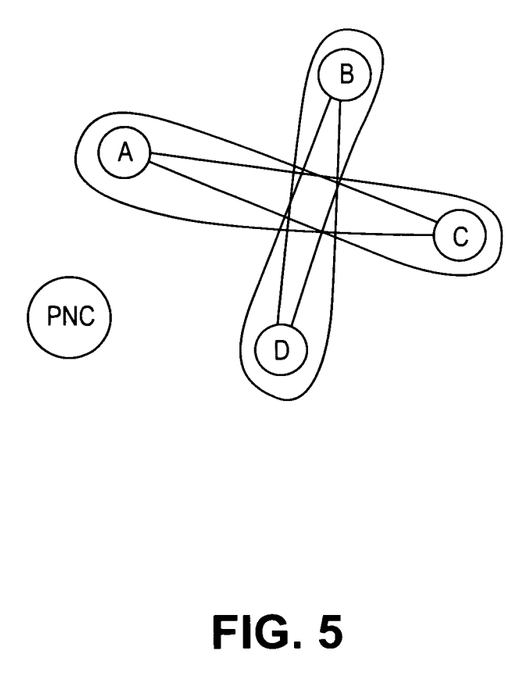
FIG. 5 shows a network in which two separate directional communications links may operate concurrently, according to an embodiment of the invention.

FIG. 5 shows a network in which two separate directional communications links may operate concurrently in a wireless network, according to an embodiment of the invention. In the illustrated network, wireless devices A and C may be assumed to have established directional communications with each other, in which A makes directional transmissions to C and/or C makes directional transmissions to A. A and C may also use directional receiving to minimize extraneous signals that might be coming from other directions. Network devices B and D establish another directional communications link between themselves, as shown. Permitting the A-C link and the B-D link to operate at the same time may create interference for one of the links, as previously described.

FIG. 6 shows a timing diagram of communications involving two directional links in a wireless network, according to an embodiment of the invention. In the illustrated examples, communication takes place over a series of superframes (SF n through SF n+x). Each frame is shown divided into three major time periods, although other periods and/or configurations may be used. In this example, one or more beacons may be transmitted by the PNC during the beacon period (BP). The second time period is shown as a contention-based access period (CAP), during which network devices may contend for the right to transmit without having their transmission pre-scheduled by a beacon. The third time period is a contention-free access period (CFAP), during which devices may transmit only if they have been scheduled to do so by a beacon from the PNC.

In SF n, device A and/or device C may request bandwidth to communicate with each other for a time T1 during the CFAP time period of subsequent superframes. During the next superframe, SF n+1, the PNC grants this request by using the beacon to schedule A and C for communication with each other during the CFAP period, and devices A-C use that time slot for their directional communications with each other in all the remaining superframes in the example (although at some point their use of this time slot would presumably come to an end). Also in SF n+1, during the CAP period, network device B and/or network device D may request bandwidth to communicate with each other for a time T2 during the CFAP time periods.

The PNC may assign a particular time period for T2, to occur during the CFAP time period, and communicate this timing information to B and D during the beacon in SF n+2. Devices B and D may then use the CAP period of SF n+2 to perform antenna training so they can establish a directional link with each other. With the parameters for a directional link established with this antenna training, devices B and D may each monitor their currently-idle directional link during period T2 of that superframe (or multiple superframes) to determine if they are getting potentially interfering signals from devices A and C (or from any other source). The results of this monitoring may then be transmitted to the PNC by each of devices B and D during the CAP period of SF n+3. If the PNC determines that the interference is not enough to prevent the link from performing adequately, permission to use the T2 time period is granted by the PCN in the beacon of SF n+4, and devices B and D may begin communicating with each other over their directional link in the CFAP period of that superframe.

During the times that devices A and C, B and D are communicating with each other over their respective directional links, they may monitor the quality of their link over a period of time (e.g., over multiple superframes), and keep statistics on that quality. Periodically, the results of that quality monitoring may be reported back to the PNC, so that the PNC may decide whether to continue granting A/C and B/D their concurrent time slots, or to reconfigure network communications. The example shows the PNC requesting this link information during the first part of the CAP of SF n+x, and devices B and/or D providing the link report in the last part of the same CAP. However, other techniques may also be used, such as but not limited to: 1) the link report may be provided by B and/or D without a request from the PNC, 2) the request and the report may occur in different superframes, 3) B and D may provide separate reports in different superframes, 4) any combination of these or other techniques, 5) etc.

Since monitoring of the idle B-D link may take place during one superframe (e.g., SF n+2), while the B-D directional communications may take place in later superframes (e.g., SF n+4 through SF n+x), this process assumes that A and C will be communicating with each other during the same portion of multiple consecutive superframes (and in the same relative physical locations) so that current interference findings can be reliably applied to subsequent superframes. This is expected to be common in many piconets. For example, A and C may communicate streaming video data during the same portion of thousands of superframes, while remaining in the same physical locations.

Although various events are shown occurring in specific and sequential superframes, this is just an example. Due to various considerations, these events may occur in non-sequential superframes or in different superframes than shown. For example, there may be one or more intervening superframes between a bandwidth request and a bandwidth grant, B and D may monitor their idle link for multiple superframes before reporting their results to the PNC, etc.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method comprising:
communicating in a wireless network by communicating a series of superframes;
transmitting an omnidirectional beacon in each of selected ones of the series of superframes, at least one of the omnidirectional beacons includes information to schedule both directional and omnidirectional communications in the superframe containing the at least one omnidirectional beacon; and
transmitting a directional beacon and no omnidirectional beacons in each of remaining ones of the series of superframes, information in a beacon indicating directional or omnidirectional communication,
wherein in each of the superframes including the directional beacon, only directional communications are permitted in the wireless network.

2. The method of claim 1, wherein the series of superframes includes more superframes with directional beacons than superframes with omnidirectional beacons.

3. The method of claim 1, wherein each of the directional beacons is directed toward at least one network device that is already associated with the network controller.

4. The method of claim 1, wherein only the superframes with the omnidirectional beacons are used for device discovery and association in the wireless network.

5. The method of claim 1, wherein at least one of the superframes with the omnidirectional beacon includes both omnidirectional and directional communications.

6. The method of claim 1, wherein the omnidirectional beacons are transmitted only in every nth superframe, where n is an integer greater than 2, for a duration of at least 12 consecutive superframes.

7. An apparatus, comprising:
a wireless communications device to transmit a series of superframes in a wireless network, each superframe having a beacon portion;
wherein the beacon portion of some of the superframes is to include an omnidirectional beacon, and the beacon portion of a remainder of the superframes is to include a directional beacon but no omnidirectional beacon, information in the beacon portion indicating directional or omnidirectional communication, wherein in each of the superframes including the directional beacon, only directional communications are permitted in the wireless network, and wherein at least one of the omnidirectional beacons includes information to schedule both directional and omnidirectional communications in the superframe containing said at least one omnidirectional beacon.

8. The apparatus of claim 7, wherein each superframe, in the series of superframes, having an omnidirectional beacon is to be immediately followed by at least two superframes having a directional beacon.

9. The apparatus of claim 7, wherein the wireless communications device is a network controller.

10. The apparatus of claim 7, wherein the wireless communications device includes a battery for operational power.

11. The apparatus of claim 7, wherein the wireless communications device includes multiple antennas.

12. The apparatus of claim 7, wherein the wireless communication device includes a phased array antenna system for directional communications.

13. The apparatus of claim 7, wherein the wireless network is a piconet.

14. An article of manufacture comprising a non-transitory machine readable medium that contains instructions, which when executed by one or more processors result in performing operations comprising:

communicating in a wireless network by communicating a series of superframes;

transmitting an omnidirectional beacon in each of selected ones of the series of superframes, at least one of the omnidirectional beacons includes information to schedule both directional and omnidirectional communications in the superframe containing the at least one omnidirectional beacon; and transmitting a directional beacon and no omnidirectional beacons in each of remaining ones of the series of superframes, information in a beacon indicating directional or omnidirectional communication, wherein in each of the superframes including the directional beacon, only directional communications are permitted in the wireless network.

15. The article of claim 14, wherein the series of superframes is to include more superframes with directional beacons than superframes with omnidirectional beacons.

16. The article of claim 14, wherein each of the directional beacons is to be directed toward at least one network device that is already associated with the network controller.

17. The article of claim 14, wherein only the superframes with the omnidirectional beacons are to be used for device discovery and association in the wireless network.

18. The article of claim 14, wherein at least one of the superframes with the omnidirectional beacon includes a directional beacon.

19. The article of claim 14, wherein the omnidirectional beacons are transmitted only in every nth superframe, where n is an integer greater than 2, for a duration of at least 12 consecutive superframes.

* * * * *